United States Patent
Izu et al.

(10) Patent No.: US 10,181,749 B2
(45) Date of Patent: Jan. 15, 2019

(54) CHARGING SYSTEM

(71) Applicant: TOYOTA JIDOSHA KABUSHIKI KAISHA, Toyota-shi, Aichi-ken (JP)

(72) Inventors: Hiroki Izu, Toyota (JP); Yu Sasaki, Toyota (JP); Yoshihiro Okumatsu, Nagakute (JP); Takahiro Nakayama, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/708,759

(22) Filed: Sep. 19, 2017

(65) Prior Publication Data

US 2018/0083478 A1 Mar. 22, 2018

(30) Foreign Application Priority Data

Sep. 21, 2016 (JP) ................. 2016-184273

(51) Int. Cl.
*H02J 7/00* (2006.01)
*H02J 7/04* (2006.01)
*B60L 11/18* (2006.01)

(52) U.S. Cl.
CPC ............ *H02J 7/045* (2013.01); *B60L 11/1824* (2013.01); *H02J 7/007* (2013.01); *H02J 7/0036* (2013.01); *H02J 7/0054* (2013.01); *H02J 7/0027* (2013.01)

(58) Field of Classification Search
CPC ........ H02J 7/045; H02J 7/0036; H02J 7/0054; H02J 7/007; H02J 7/0027; B60L 11/1824

USPC .......................................................... 320/109
See application file for complete search history.

(56) References Cited

U.S. PATENT DOCUMENTS

| | | | |
|---|---|---|---|
| 4,577,144 A | 3/1986 | Hodgman et al. | |
| 9,800,075 B2 * | 10/2017 | McLean | H02J 7/0054 |
| 2007/0229031 A1 | 10/2007 | Song et al. | |
| 2017/0222450 A1 * | 8/2017 | Lee | H02J 7/007 |
| 2018/0149710 A1 * | 5/2018 | Hindle | G01R 31/40 |

FOREIGN PATENT DOCUMENTS

| | | |
|---|---|---|
| JP | 08-94726 A | 4/1996 |
| JP | 11-69638 A | 3/1999 |
| JP | 2007-267584 A | 10/2007 |
| JP | 2009-219178 A | 9/2009 |
| JP | 2012-52831 A | 3/2012 |
| JP | 2013-234879 A | 11/2013 |

(Continued)

*Primary Examiner* — Nathaniel Pelton
(74) *Attorney, Agent, or Firm* — Sughrue Mion, PLLC

(57) ABSTRACT

A charging system that includes a charging device and a secondary battery device with improved safety is provided. When the secondary battery device has been connected to a charging terminal of the charging device, a DC voltage for inspection is supplied from a DC power supply unit to the charging terminal to detect a DC signal by a DC signal detection unit, and an AC voltage for inspection is supplied from an AC power supply unit to the charging terminal to detect an AC signal by an AC signal detection unit. The secondary battery device is started to be charged only when the value of the DC signal falls within a reference range defined by a resistance value of the secondary battery device and the value of the AC signal falls within a reference range defined by an impedance value of the secondary battery device.

4 Claims, 5 Drawing Sheets

(56) References Cited

FOREIGN PATENT DOCUMENTS

| | | |
|---|---|---|
| JP | 2015-14563 A | 1/2015 |
| JP | 2015-56225 A | 3/2015 |
| WO | 2016/067486 A1 | 5/2016 |

* cited by examiner

CHARGING SYSTEM

CROSS REFERENCE TO RELATED APPLICATIONS

This application is based upon and claims the benefit of priority from Japanese patent application No. 2016-184273, filed on Sep. 21, 2016, the disclosure of which is incorporated herein in its entirety by reference.

BACKGROUND

The present invention relates to a charging system, and more particularly, to a charging system that charges a secondary battery device by a charging device.

In general, a charging system that charges a secondary battery device by a charging device determines whether an object that has come into contact with a charging terminal of the charging device is an object to be charged (i.e., the secondary battery device) in order to prevent an object which is not the object to be charged from being charged for safety reasons. The object starts to be charged only when this object is determined to be the object to be charged.

A charging device disclosed in Japanese Unexamined Patent Application Publication No. 2007-267584 detects, when an object has contacted a charging terminal of the charging device, a DC voltage that varies depending on a resistance value of this object and determines whether this object is an object to be charged.

SUMMARY

In the method disclosed in Japanese Unexamined Patent Application Publication No. 2007-267584, however, when the resistance value of the object that has come into contact with the charging terminal of the charging device happens to be equal to the resistance value of the object to be charged, it is possible that an object which is not the object to be charged may be erroneously charged.

The present invention has been made in view of the aforementioned circumstances and provides a charging system with improved safety.

A charging system according to one aspect of the present invention is a charging system including a charging device and a secondary battery device charged by the charging device, in which the charging device includes:
a charging terminal to which the secondary battery device is connected;
a DC power supply unit that supplies a DC voltage to the charging terminal;
an AC power supply unit that supplies an AC voltage to the charging terminal;
a DC signal detection unit that detects a DC signal that varies depending on a resistance value of an object that has been connected to the charging terminal; and
an AC signal detection unit that detects an AC signal that varies depending on an impedance value of the object that has been connected to the charging terminal, and
when the secondary battery device has been connected to the charging terminal,
a DC voltage for inspection is supplied from the DC power supply unit to the charging terminal to detect the DC signal by the DC signal detection unit and an AC voltage for inspection is supplied from the AC power supply unit to the charging terminal to detect the AC signal by the AC signal detection unit, and the secondary battery device is started to be charged only when the value of the DC signal that has been detected falls within a reference range defined by a resistance value of the secondary battery device and the value of the AC signal that has been detected falls within a reference range defined by an impedance value of the secondary battery device.

In the charging system according to one aspect of the present invention, when the secondary battery device has been connected to the charging terminal, the DC voltage for inspection is supplied from the DC power supply unit to the charging terminal to detect the DC signal by the DC signal detection unit and the AC voltage for inspection is supplied from the AC power supply unit to the charging terminal to detect the AC signal by the AC signal detection unit. The secondary battery device starts to be charged only when the value of the DC signal that has been detected falls within the reference range defined by the resistance value of the secondary battery device and the value of the AC signal that has been detected falls within the reference range defined by the impedance value of the secondary battery device.

In summary, in the charging system according to one aspect of the present invention, the charging operation is not started unless both the resistance value and the impedance value of the object that has been connected to the charging terminal are equal to those of the secondary battery device. The probability that both the resistance value and the impedance value are equal to those of the secondary battery device is much lower than the probability that only the resistance value is equal to that of the secondary battery device. Accordingly, this system is much safer than that of related art.

The secondary battery device preferably includes a battery cell connected to the charging terminal and a filter circuit connected to the battery cell.

According to such a structure, variations in manufacturing of the impedance value of the secondary battery device can be suppressed. Accordingly, the reference range defined by the impedance value of the secondary battery device can be narrowed. As a result, the accuracy of determining whether the object that has been connected to the charging terminal of the charging device is the secondary battery device can be improved.

Further, the DC signal detected by the DC signal detection unit is preferably a DC voltage and the AC signal detected by the AC signal detection unit is preferably an AC voltage.

According to such a structure, a simple circuit configuration can be achieved.

Furthermore, the secondary battery device is preferably mounted on an autonomous moving robot.

The charging system according to one aspect of the present invention is particularly suitable for these applications.

According to the present invention, it is possible to provide a charging system with improved safety.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, with reference to the drawings, specific embodiments to which the present invention is applied will be described in detail. However, the present invention is not limited to the following embodiments. Further, for the sake of clarity of descriptions, the following descriptions and the drawings are simplified as appropriate.

First Embodiment

<Structure of Charging System>

Figure 1:
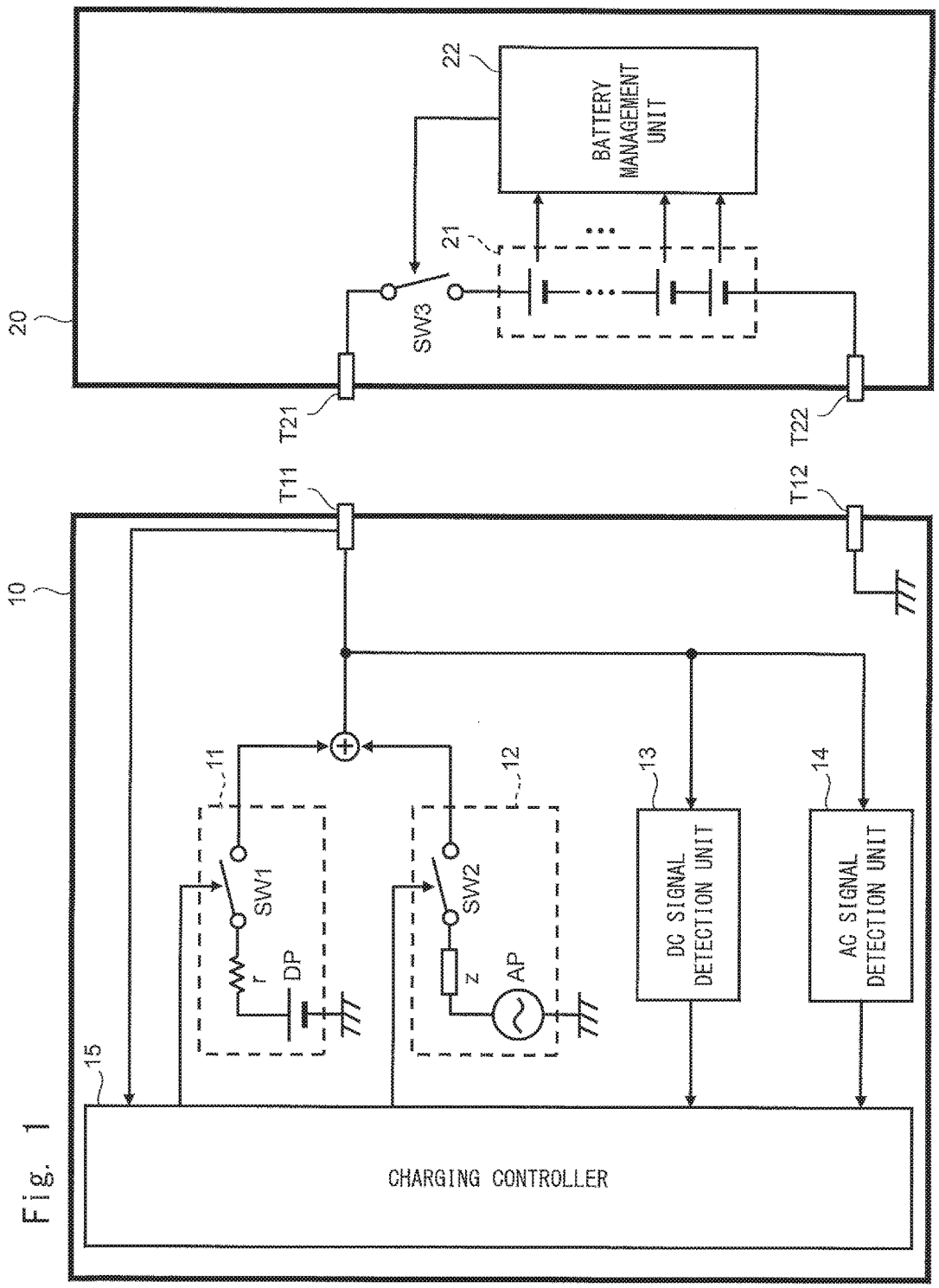
FIG. 1 is a block diagram showing a charging system according to a first embodiment.

With reference to FIG. 1, a charging system according to a first embodiment will be described. FIG. 1 is a block diagram showing the charging system according to the first embodiment.

As shown in FIG. 1, the charging system according to the first embodiment includes a charging device 10 and a secondary battery device 20. A charging terminal T21 of the secondary battery device 20 is connected to a charging terminal T11 of the charging device 10 and a ground terminal T22 of the secondary battery device 20 is connected to a ground terminal T12 of the charging device 10, whereby the secondary battery device 20 is charged by the charging device 10.

First, a structure of the charging device 10 will be described.

As shown in FIG. 1, the charging device 10 includes a DC power supply unit 11, an AC power supply unit 12, a DC signal detection unit 13, an AC signal detection unit 14, and a charging controller 15.

As shown in FIG. 1, the DC power supply unit 11 includes a DC power supply DP and a switch SW1. FIG. 1 also shows an internal resistor r of the DC power supply unit 11. The switch SW1 is controlled to be turned on or off by the charging controller 15. When the switch SW1 is turned on, a DC voltage is supplied from the DC power supply unit 11 to the charging terminal T11. When the switch SW1 is turned off, the supply of the DC voltage from the DC power supply unit 11 to the charging terminal T11 is interrupted.

The DC voltage supplied from the DC power supply unit 11 to the charging terminal T11 includes a DC voltage for charging and a DC voltage for inspection. The DC voltage for charging is a DC voltage that is supplied to the charging terminal T11 for a long time from start of charging to end of charging in order to charge the secondary battery device 20. On the other hand, the DC voltage for inspection is a DC voltage that is temporarily supplied to the charging terminal T11 before the charging is started in order to determine whether the object that has been connected to the charging terminal T11 is the secondary battery device 20.

In this embodiment, the value of the DC voltage for charging is equal to the value of the DC voltage for inspection. However, the value of the DC voltage for charging may be different from the value of the DC voltage for inspection. The charging controller 15 may control the DC power supply DP in such a way that, for example, the value of the DC voltage for inspection becomes smaller than the value of the DC voltage for charging. The value of the DC voltage for charging is, for example, about 24-42 V.

The AC power supply unit 12 includes an AC power supply AP and a switch SW2. FIG. 1 also shows an internal impedance (output impedance) z of the AC power supply unit 12. The switch SW2 is controlled to be turned on or off by the charging controller 15. When the switch SW2 is turned on, an AC voltage is supplied from the AC power supply unit 12 to the charging terminal T11. When the switch SW2 is turned off, the supply of the AC voltage from the AC power supply unit 12 to the charging terminal T11 is interrupted.

The AC voltage supplied from the AC power supply unit 12 to the charging terminal T11 is only an AC voltage for inspection. The AC voltage for inspection is temporarily supplied to the charging terminal T11 before the charging is started in order to determine whether the object that has been connected to the charging terminal T11 is the secondary battery device 20. The AC voltage for inspection is preferably superimposed on the DC voltage for inspection and then supplied to the charging terminal T11. The AC voltage for inspection may be applied in a predetermined cycle and at a predetermined amplitude level or may be applied in different cycles or at different amplitude levels. The cycle or the amplitude may be, for example, swept.

The DC signal detection unit 13 detects a DC signal that varies depending on the resistance value of the object that has been connected to the charging terminal T11. As shown in FIG. 1, in this embodiment, the DC voltage of the charging terminal T11 divided by the resistor of the object (in the example shown in FIG. 1, the secondary battery device 20) connected to the charging terminal T11 and the internal resistor r of the DC power supply unit 11 is detected as the DC signal. The internal resistor r of the DC power supply unit 11 and the resistor of the object connected to the charging terminal T11 are connected in series between the DC power supply DP and the ground. The DC voltage of the charging terminal T11 detected by the DC signal detection unit 13 is output to the charging controller 15. The DC signal detection unit 13 may be composed of hardware such as a circuit or may be composed of a function of software such as a program.

A direct current that flows through the charging terminal T11 may be detected as the DC signal. In this case, a current detection circuit needs to be provided. Therefore, the DC voltage is preferably detected as in this embodiment since the circuit configuration can be made simpler.

Further, this embodiment will be described in further detail, in which the DC voltage of the charging terminal T11 when the secondary battery device 20 has been connected to the charging terminal T11 will be denoted by a reference DC voltage Vds. The reference DC voltage Vds is defined by the resistance value of the secondary battery device 20. When the resistance value of the object that has been connected to the charging terminal T11 is higher than the resistance value of the secondary battery device 20, the DC voltage of the charging terminal T11 to be detected becomes higher than the reference DC voltage Vds. On the other hand, when the resistance value of the object that has been connected to the charging terminal T11 is lower than the resistance value of the secondary battery device 20, the DC voltage of the charging terminal T11 to be detected becomes lower than the reference DC voltage Vds. Accordingly, it is possible to determine whether the object that has been connected to the charging terminal T11 is the secondary battery device 20.

The AC signal detection unit 14 detects an AC signal that varies depending on the impedance value of the object that has been connected to the charging terminal T11. As shown in FIG. 1, in this embodiment, the AC voltage of the charging terminal T11 divided by the impedance of the object (in the example shown in FIG. 1, the secondary battery device 20) connected to the charging terminal T11 and the internal impedance z of the AC power supply unit 12 is detected as the AC signal. The internal impedance z of the AC power supply unit 12 and the impedance of the object that has been connected to the charging terminal T11 are connected in series between the AC power supply AP and the ground. The AC voltage of the charging terminal T11 detected by the AC signal detection unit 14 is output to the charging controller 15. The AC signal detection unit 14 may be composed of hardware such as a circuit or may be composed of a function of software such as a program.

An alternating current that flows through the charging terminal T11 may be detected as the AC signal. In this case, a current detection circuit needs to be provided. Therefore, the AC voltage is preferably detected as in this embodiment since the circuit configuration can be made simpler.

Further, this embodiment will be described in further detail, in which the AC voltage of the charging terminal T11 when the secondary battery device 20 has been connected to the charging terminal T11 will be denoted by a reference AC voltage Vas. The reference AC voltage Vas is defined by the impedance value of the secondary battery device 20. When the impedance value of the object that has been connected to the charging terminal T11 is higher than the impedance value of the secondary battery device 20, the AC voltage of the charging terminal T11 to be detected becomes higher than the reference AC voltage Vas. On the other hand, when the impedance value of the object that has been connected to the charging terminal T11 is lower than the impedance value of the secondary battery device 20, the AC voltage of the charging terminal T11 to be detected becomes lower than the reference AC voltage Vas. Accordingly, it is possible to determine whether the object that has been connected to the charging terminal T11 is the secondary battery device 20.

The charging controller 15 includes, for example, an operation unit such as a central processing unit (CPU) and a storage unit such as a random access memory (RAM) and a read only memory (ROM) in which various control programs and data are stored, although these elements are not shown in FIG. 1.

As shown in FIG. 1, the charging controller 15 detects that the object has been connected to the charging terminal T11. The charging terminal T11 is, for example, a push-button terminal and the charging controller 15 is able to detect that the object has been connected to the charging terminal T11. Alternatively, it may be possible to detect that the object has been connected to the charging terminal T11 by constantly supplying a small voltage or current to the charging terminal T11.

When the charging controller 15 has detected the connection of the object to the charging terminal T11, the charging controller 15 controls the DC power supply unit 11 to cause the DC power supply unit 11 to supply the DC voltage for inspection to the charging terminal T11. At the same time, the charging controller 15 controls the AC power supply unit 12 to cause the AC power supply unit 12 to supply the AC voltage for inspection to the charging terminal T11.

The DC voltage detected by the DC signal detection unit 13 in accordance with the supply of the DC voltage for inspection is input to the charging controller 15. The charging controller 15 determines whether the value of the DC voltage that has been input thereto falls within a reference range defined by the resistance value of the secondary battery device 20. This reference range is obtained by setting a wide range for the aforementioned reference DC voltage Vds and is stored, for example, in the storage unit. This range is determined as appropriate based on variations in manufacturing of the resistance value of the secondary battery device 20 or the like.

Further, the AC voltage detected by the AC signal detection unit 14 in accordance with the supply of the AC voltage for inspection is input to the charging controller 15. The charging controller 15 determines whether the value of the AC voltage that has been input thereto falls within a reference range defined by the impedance value of the secondary battery device 20. This reference range is obtained by setting a wide range for the aforementioned reference AC voltage Vas and is stored, for example, in the storage unit. This range is determined as appropriate based on variations in manufacturing of the impedance value of the secondary battery device 20 or the like.

The charging controller 15 determines that the object that has been connected to the charging terminal T11 is the secondary battery device 20 and starts charging the secondary battery device 20 only when both the value of the DC voltage and that of the AC voltage that have been input fall within the reference ranges. That is, when both the value of the DC voltage and that of the AC voltage that have been input fall within the reference ranges, the charging controller 15 controls the DC power supply unit 11 to cause the DC power supply unit 11 to supply the DC voltage for charging to the charging terminal T11.

On the other hand, when at least one of the value of the DC voltage and that of the AC voltage that have been input does not fall within the reference range, the charging controller 15 determines that the object that has been connected to the charging terminal T11 is not the secondary battery device 20 and does not start charging the secondary battery device 20.

Next, a structure of the secondary battery device 20 will be described.

As shown in FIG. 1, the secondary battery device 20 includes a battery cell 21, a battery management unit 22, and a switch SW3.

The battery cell 21 includes a plurality of unit cells connected in series with each other between the charging terminal T21 and the ground terminal T22 of the secondary battery device 20. Further, the battery cell 21 is connected in series with the switch SW3 between the charging terminal T21 and the ground terminal T22 of the secondary battery device 20.

The battery management unit 22 monitors the temperature, the voltage, the current and the like of each of the unit cells in order to suppress thermal runaway or the like due to overcharge. When the battery management unit 22 detects overcharge, an abnormal increase in the temperature or the like, the battery management unit 22 turns off the switch SW3 and interrupts charging of the battery cell 21. That is, as long as the charging operation is being normally performed, the switch SW3 is always in the ON state. The battery management unit 22 is, for example, a so-called battery management system (BMS).

In the following description, effects of the charging system according to the first embodiment will be described.

In related art, when it is determined whether the object that has been connected to the charging terminal of the charging device is the secondary battery device (object to be charged), only the DC voltage for inspection is supplied. Therefore, when the resistance value of the object that has come into contact with the charging terminal happens to be equal to the resistance value of the secondary battery device, it is possible that an object which is not the secondary battery device may be erroneously charged.

On the other hand, in the charging system according to the first embodiment, when it is determined whether the object that has been connected to the charging terminal T11 of the charging device 10 is the secondary battery device 20, besides the DC voltage for inspection, the AC voltage for inspection is also supplied. Accordingly, in the charging system according to the first embodiment, the charging operation is not started unless both the resistance value and the impedance value of the object that has come into contact with the charging terminal T11 are equal to those of the secondary battery device 20. The probability that both the resistance value and the impedance value are equal to those of the secondary battery device 20 is much lower than the probability that only the resistance value is equal to that of the secondary battery device 20. Accordingly, the charging system according to the first embodiment is much safer than that in related art.

The charging system according to the first embodiment may be used for various applications without any limitation and is particularly suitable for an application in which, for example, the secondary battery device 20 is mounted on an autonomous moving robot. When the secondary battery device 20 is the autonomous moving robot, the autonomous moving robot is autonomously attached to or detached from the charging device 10. Accordingly, even when the autonomous moving robot is located away from the charging device 10, i.e., when the robot is not being charged, the charging device 10 is always ready to be charged. Therefore, particularly high safety for the charging system of the autonomous moving robot is demanded.

<One Example of Charging Control Method using Charging System>

Figure 2:
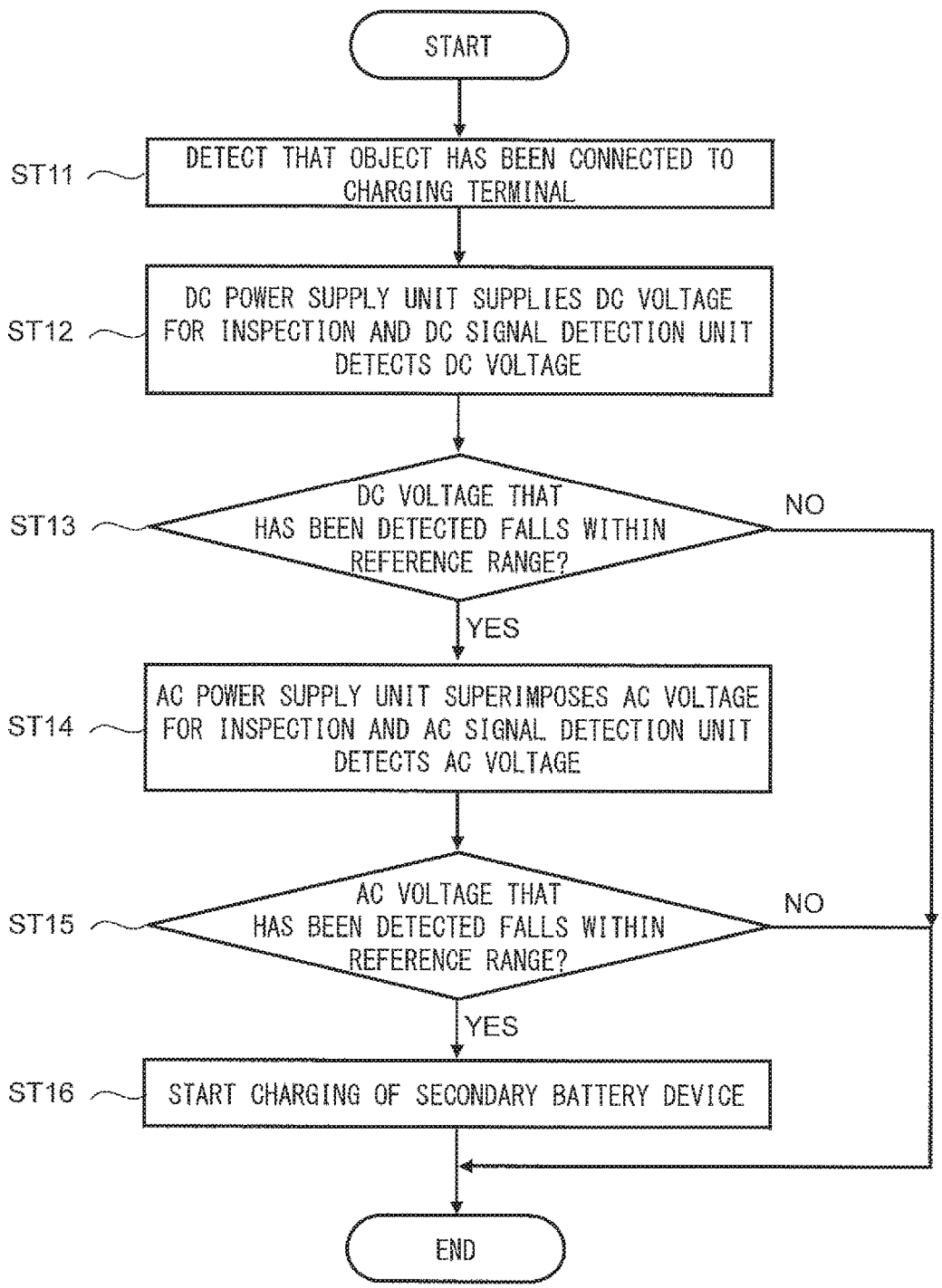
FIG. 2 is a flowchart showing one example of a charging control method using the charging system according to the first embodiment.

With reference next to FIG. 2, one example of the charging control method using the charging system according to the first embodiment will be described. FIG. 2 is a flowchart showing one example of the charging control method using the charging system according to the first embodiment. In the description with reference to FIG. 2, the block diagram of the charging system shown in FIG. 1 is also referred to.

As shown in FIG. 2, first, the charging controller 15 shown in FIG. 1 detects that the object has been connected to the charging terminal T11 of the charging device 10 (Step ST11).

Next, based on the control by the charging controller 15, the switch SW1 of the DC power supply unit 11 is turned on and the DC voltage for inspection is supplied to the charging terminal T11. In accordance therewith, the DC signal detection unit 13 detects the DC voltage of the charging terminal T11 (Step ST12). As described above, the DC voltage of the charging terminal T11 detected here is obtained by dividing the DC voltage of the DC power supply DP by the resistor of the object (in the example shown in FIG. 1, the secondary battery device 20) connected to the charging terminal T11 and the internal resistor r of the DC power supply unit 11.

Next, the charging controller 15 determines whether the DC voltage of the charging terminal T11 detected by the DC signal detection unit 13 falls within the reference range defined by the resistance value of the secondary battery device 20 (Step ST13). As described above, this reference range is obtained by setting a wide range for the reference DC voltage Vds defined by the resistance value of the secondary battery device 20.

When the DC voltage of the charging terminal T11 detected by the DC signal detection unit 13 does not fall within the reference range defined by the resistance value of the secondary battery device 20 (NO in Step ST13), the charging controller 15 determines that the object that has been connected to the charging terminal T11 is not the secondary battery device 20 and ends the processing without starting charging.

On the other hand, when the DC voltage of the charging terminal T11 detected by the DC signal detection unit 13 falls within the reference range defined by the resistance value of the secondary battery device 20 (YES in Step ST13), the switch SW2 of the AC power supply unit 12 is turned on and the AC voltage for inspection is superimposed on the DC voltage for inspection in the charging terminal T11 based on the control by the charging controller 15. In accordance therewith, the AC signal detection unit 14 detects the AC voltage of the charging terminal T11 (Step ST14). As described above, the AC voltage of the charging terminal T11 detected here is obtained by dividing the AC voltage of the AC power supply AP by the impedance of the object (in the example shown in FIG. 1, the secondary battery device 20) connected to the charging terminal T11 and the internal impedance z of the AC power supply unit 12.

Next, the charging controller 15 determines whether the AC voltage of the charging terminal T11 detected by the AC signal detection unit 14 falls within the reference range defined by the impedance value of the secondary battery device 20 (Step ST15). As described above, this reference range is obtained by setting a wide range for the reference AC voltage Vas defined by the impedance value of the secondary battery device 20.

When the AC voltage of the charging terminal T11 detected by the AC signal detection unit 14 does not fall within the reference range defined by the impedance value of the secondary battery device 20 (NO in Step ST15), the charging controller 15 determines that the object that has been connected to the charging terminal T11 is not the secondary battery device 20 and ends the processing without starting the charging.

On the other hand, when the AC voltage detected by the AC signal detection unit 14 falls within the reference range defined by the impedance value of the secondary battery device 20 (YES in Step ST15), the charging controller 15 determines that the object that has been connected to the charging terminal T11 is the secondary battery device 20. Then the charging controller 15 controls the DC power supply unit 11 to cause the DC power supply unit 11 to supply the DC voltage for charging to the charging terminal T11 and starts charging (Step ST16).

In the charging control method using the charging system according to the first embodiment, when it is determined whether the object that has been connected to the charging terminal T11 of the charging device 10 is the secondary battery device 20, besides the DC voltage for inspection, the AC voltage for inspection is supplied. Accordingly, the charging operation is not started unless both the resistance value and the impedance value of the object that has come into contact with the charging terminal T11 become equal to those of the secondary battery device 20. The probability that both the resistance value and the impedance value become equal to those of the secondary battery device 20 is much lower than the probability that only the resistance value becomes equal to that of the secondary battery device 20. Accordingly, the safety is much improved than that in related art.

The charging system according to the first embodiment may be used for various applications without any limitation and is particularly suitable for an application in which, for example, the secondary battery device 20 is mounted on an autonomous moving robot. When the secondary battery device 20 is the autonomous moving robot, the autonomous moving robot is autonomously attached to or detached from the charging device 10. Accordingly, even when the autonomous moving robot is located away from the charging device 10, i.e., when the robot is not being charged, the charging device 10 is always ready to be charged. Therefore, particularly high safety is demanded for the charging system of the autonomous moving robot.

<Another Example of Charging Control Method using Charging System>

Figure 3:
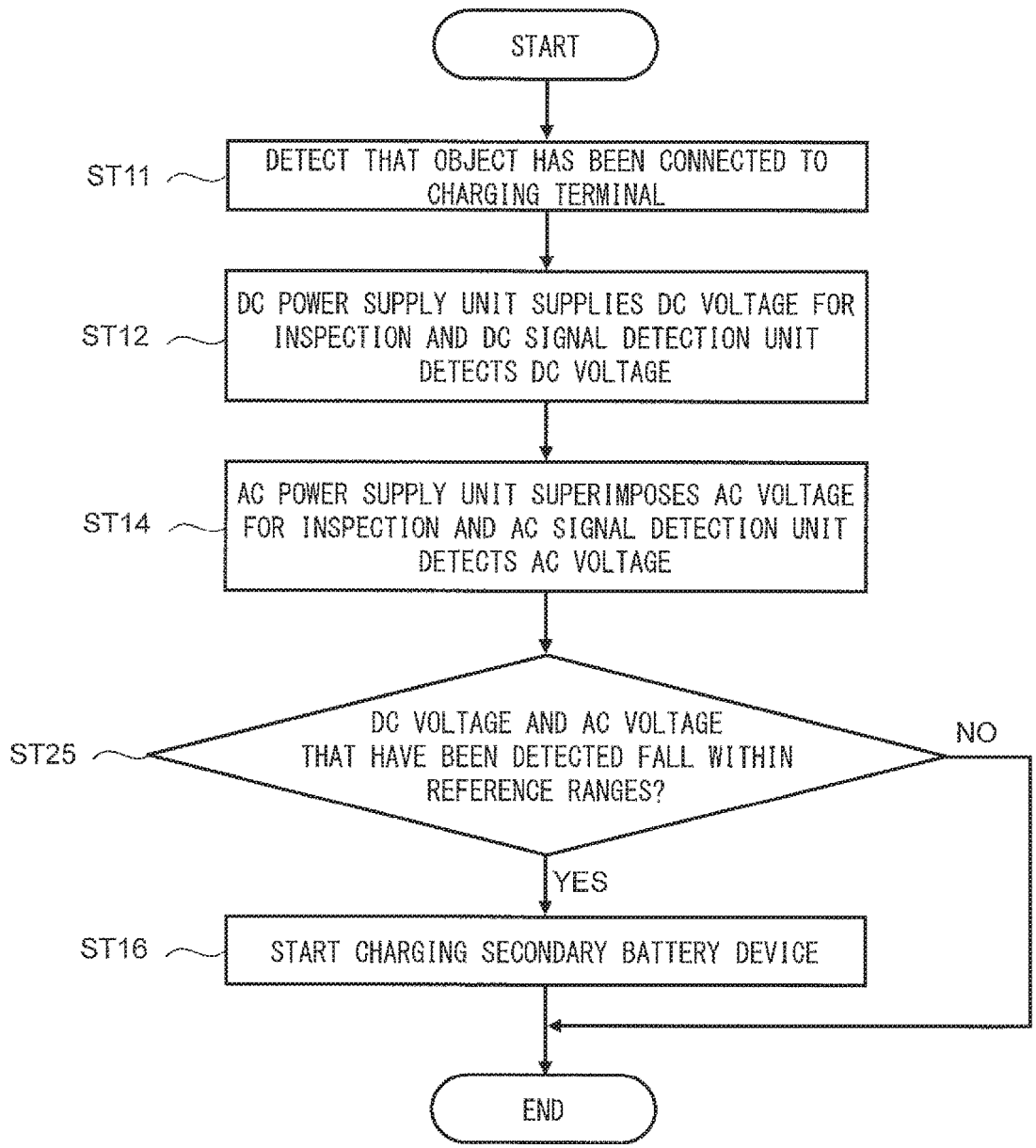
FIG. 3 is a flowchart showing another example of the charging control method using the charging system according to the first embodiment.

With reference next to FIG. 3, another example of the charging control method using the charging system according to the first embodiment will be described. FIG. 3 is a flowchart showing another example of the charging control method using the charging system according to the first embodiment.

Steps ST11, ST12, ST14, and ST16 shown in FIG. 3 are the same as Steps ST11, ST12, ST14, and ST16 shown in FIG. 2.

As shown in FIG. 3, in this example of the charging control method, after Step ST12, Step ST14, not Step ST13, is performed.

That is, based on the control by the charging controller 15, the switch SW1 of the DC power supply unit 11 is turned on and the DC voltage for inspection is supplied to the charging terminal T11. In accordance therewith, the DC signal detection unit 13 detects the DC voltage of the charging terminal T11 (Step ST12). Subsequently, based on the control by the charging controller 15, the switch SW2 of the AC power supply unit 12 is turned on and the AC voltage for inspection is superimposed on the DC voltage for inspection in the charging terminal T11. In accordance therewith, the AC signal detection unit 14 detects the AC voltage of the charging terminal T11 (Step ST14).

Next, the charging controller 15 determines whether the DC voltage of the charging terminal T11 detected by the DC signal detection unit 13 falls within the reference range defined by the resistance value of the secondary battery device 20 and whether the AC voltage of the charging terminal T11 detected by the AC signal detection unit 14 falls within the reference range defined by the impedance value of the secondary battery device 20 (Step ST25).

When at least one of the DC voltage of the charging terminal T11 detected by the DC signal detection unit 13 and the AC voltage of the charging terminal T11 detected by the AC signal detection unit 14 does not fall within the reference range (NO in Step ST25), the charging controller 15 determines that the object that has been connected to the charging terminal T11 is not the secondary battery device 20 and ends the processing without starting charging.

On the other hand, when both the DC voltage of the charging terminal T11 detected by the DC signal detection unit 13 and the AC voltage of the charging terminal T11 detected by the AC signal detection unit 14 fall within the reference ranges (YES in Step ST25), the charging controller 15 determines that the object that has been connected to the charging terminal T11 is the secondary battery device 20. Then the charging controller 15 controls the DC power supply unit 11 to cause the DC power supply unit 11 to supply the DC voltage for charging to the charging terminal T11 and starts charging (Step ST16).

In the example shown in FIG. 2, after the DC voltage for inspection has been supplied to the charging terminal T11 (Step ST12), it is determined whether the DC voltage of the charging terminal T11 falls within the reference range (Step ST13). When the DC voltage of the charging terminal T11 falls within the reference range (YES in Step ST13), the AC voltage for inspection is superimposed on the charging terminal T11 (Step ST14). Meanwhile, when the DC voltage of the charging terminal T11 does not fall within the reference range (NO in Step ST13), the AC voltage for inspection is not supplied to the charging terminal T11.

On the other hand, in the example shown in FIG. 3, after the DC voltage for inspection has been supplied to the charging terminal T11 (Step ST12), the AC voltage for inspection is superimposed on the charging terminal T11 (Step ST14). That is, the AC voltage for inspection is definitely supplied to the charging terminal T11. Then the determination whether the DC voltage of the charging terminal T11 falls within the reference range and the determination whether the AC voltage of the charging terminal T11 falls within the reference range are collectively performed (Step ST25).

In the example shown in FIG. 2, when the DC voltage of the charging terminal T11 falls within the reference range, then the AC voltage for inspection is superimposed on the charging terminal T11 for the determination. That is, the determination needs to be performed twice by separate steps, i.e., Steps ST13 and ST15, which increases the time required for making the determination.

On the other hand, in the example shown in FIG. 3, although the AC voltage for inspection needs to be definitely superimposed on the charging terminal T11, the determination is performed only once in Step ST25. Accordingly, the time during which the DC voltage of the charging terminal T11 is supplied is always constant and the time required for making the determination shorter than that when the determination is performed twice in Steps ST13 and ST15 in the example shown in FIG. 2.

Second Embodiment

Figure 4:
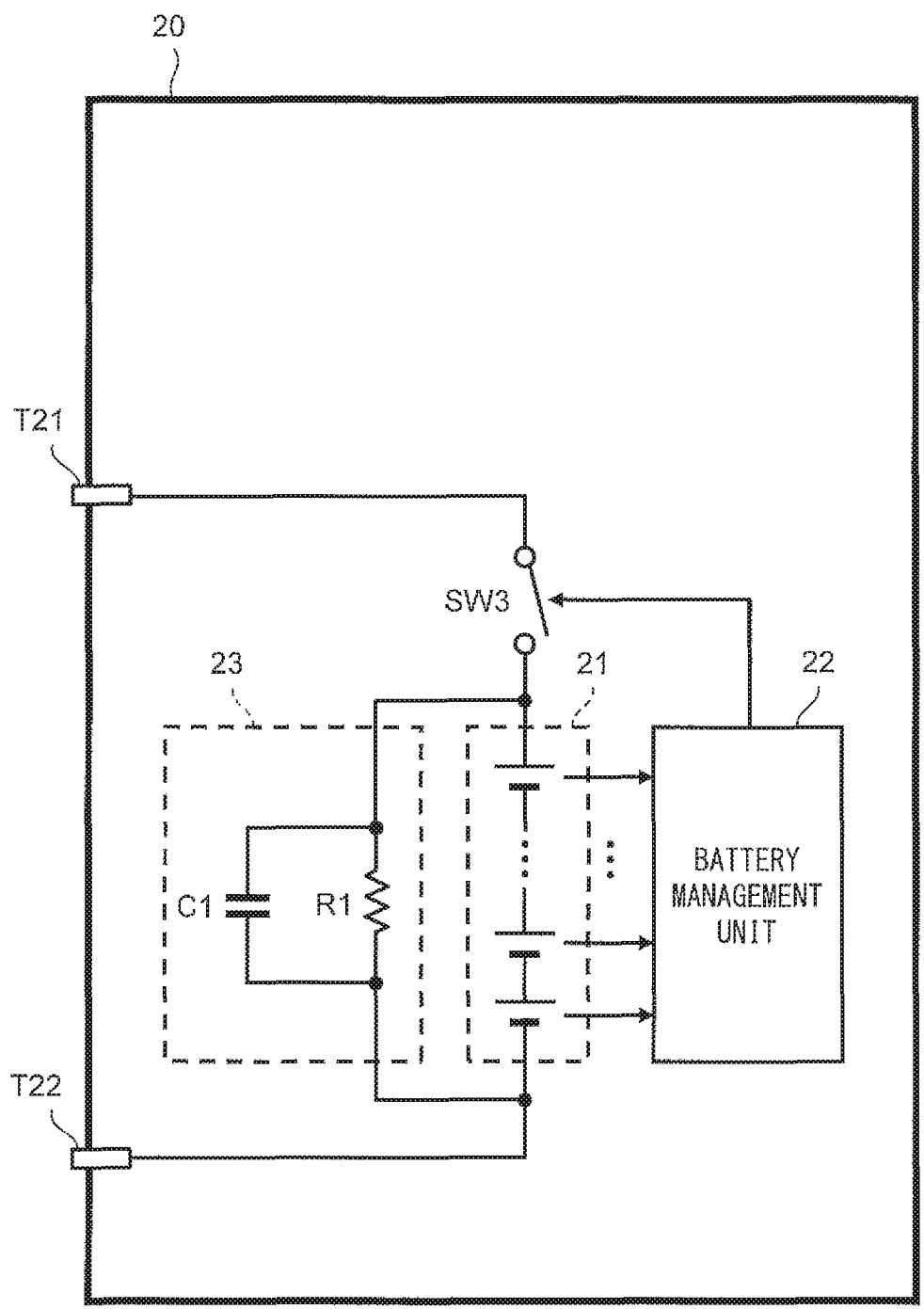
FIG. 4 is a block diagram showing a secondary battery device 20 of a charging system according to a second embodiment.

With reference next to FIG. 4, a charging system according to a second embodiment will be described. FIG. 4 is a block diagram showing a secondary battery device 20 of the charging system according to the second embodiment.

As shown in FIG. 4, in the secondary battery device 20 of the charging system according to the second embodiment, a filter circuit 23 connected in parallel with a battery cell 21 is provided. The filter circuit 23 includes a resistor R1 and a capacitor C1 that are connected in parallel. Note that the structure of the filter circuit 23 shown in FIG. 4 is merely one example and is not limited to the one shown in FIG. 4. Various structures may be employed.

In the charging system according to the second embodiment, by providing the filter circuit 23 in the secondary battery device 20, the variations in manufacturing of the impedance value of the secondary battery device 20 can be suppressed. Accordingly, for example, the reference range defined by the impedance value of the secondary battery device 20 can be narrowed. As a result, it is possible to improve the accuracy of determining whether the object that has been connected to the charging terminal T11 of the charging device 10 is the secondary battery device 20.

Further, by setting the impedance value of the filter circuit 23 for each type of the secondary battery device 20, it is possible to easily determine the type of the secondary battery device 20.

Third Embodiment

Figure 5:
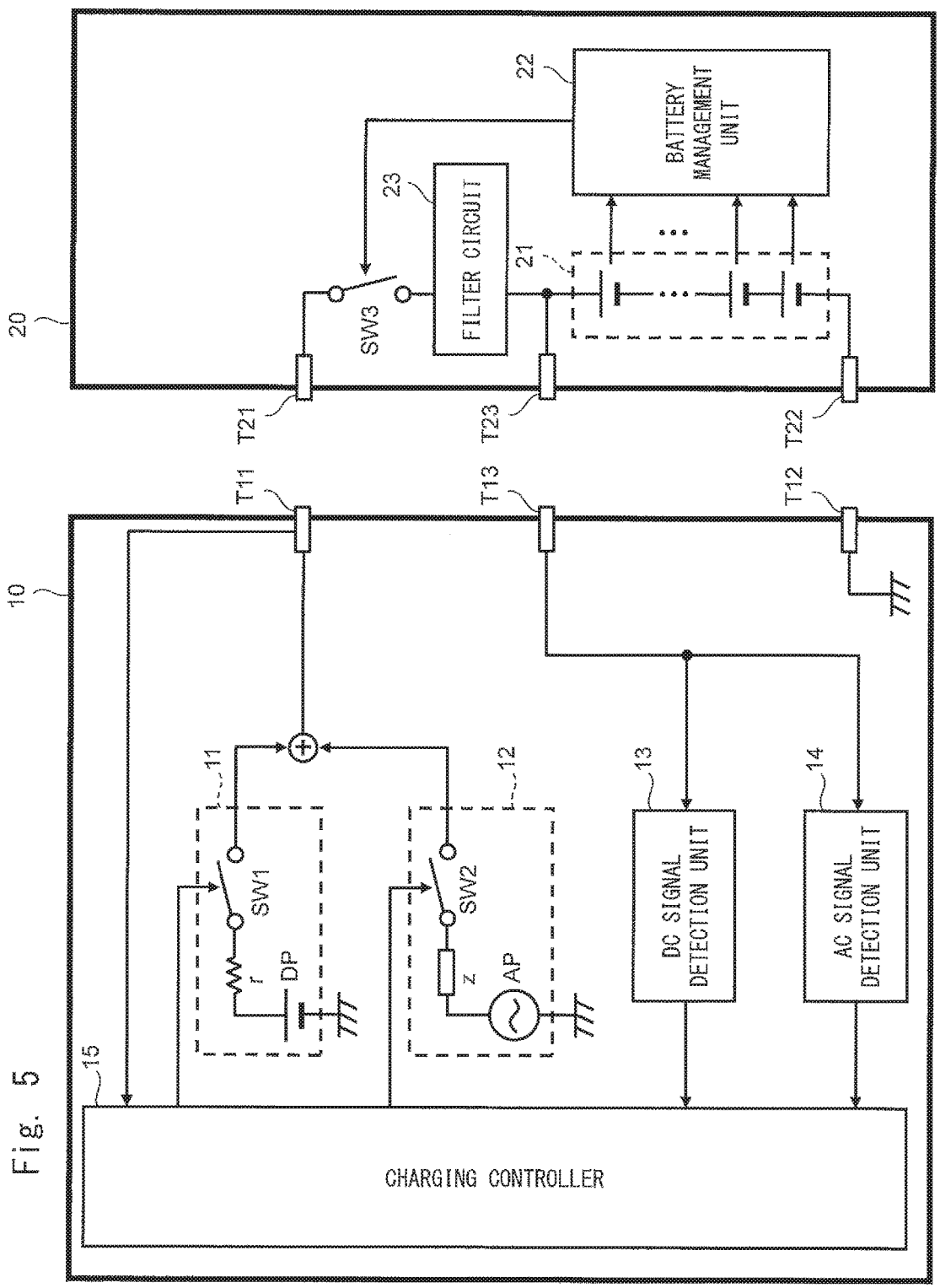
FIG. 5 is a block diagram showing a charging system according to a third embodiment.

With reference next to FIG. 5, a charging system according to a third embodiment will be described. FIG. 5 is a block diagram showing a charging system according to the third embodiment.

As shown in FIG. 5, in a secondary battery device 20 of the charging system according to the third embodiment, a filter circuit 23 is connected in series with a battery cell 21. Further, a detection terminal T23 connected to the node between the filter circuit 23 and the battery cell 21 is provided.

In a charging device 10 of the charging system according to the third embodiment, a detection terminal T13 to be connected to the detection terminal T23 is provided. The DC signal detection unit 13 detects the DC voltage of the detection terminal T13, not that of the charging terminal T11. The AC signal detection unit 14 detects the AC voltage of the detection terminal T13, not that of the charging terminal T11.

According to the charging system in the third embodiment as well, by providing the filter circuit 23 in the secondary battery device 20, the variations in manufacturing of the impedance value of the secondary battery device 20 can be suppressed. Accordingly, for example, the reference range defined by the impedance value of the secondary battery device 20 can be narrowed. As a result, the accuracy of determining whether the object that has been connected to the charging terminal T11 of the charging device 10 is the secondary battery device 20 can be improved.

Further, by setting the impedance value of the filter circuit 23 for each type of the secondary battery device 20, it is possible to easily determine the type of the secondary battery device 20.

In addition, since the detection terminal T13 is provided separately from the charging terminal T11, the accuracy of determining whether the object that has been connected to the charging terminal T11 of the charging device 10 is the secondary battery device 20 can be improved. This is because the probability that the object which is not the secondary battery device 20 is connected to (contacts) both the charging terminal T11 and the detection terminal T13 is low.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A charging system comprising a charging device and a secondary battery device charged by the charging device, wherein
   the charging device comprises:
   a charging terminal to which the secondary battery device is connected;
   a DC power supply unit that supplies a DC voltage to the charging terminal;
   an AC power supply unit that supplies an AC voltage to the charging terminal;
   a DC signal detection unit that detects a DC signal that varies depending on a resistance value of an object that has been connected to the charging terminal; and
   an AC signal detection unit that detects an AC signal that varies depending on an impedance value of the object that has been connected to the charging terminal, and
   when the secondary battery device has been connected to the charging terminal,
   a DC voltage for inspection is supplied from the DC power supply unit to the charging terminal to detect the DC signal by the DC signal detection unit and an AC voltage for inspection is supplied from the AC power supply unit to the charging terminal to detect the AC signal by the AC signal detection unit, and
   the secondary battery device starts to be charged only when the value of the DC signal that has been detected falls within a reference range defined by a resistance value of the secondary battery device and the value of the AC signal that has been detected falls within a reference range defined by an impedance value of the secondary battery device.

2. The charging system according to claim 1, wherein the secondary battery device comprises:
   a battery cell connected to the charging terminal; and
   a filter circuit connected to the battery cell.

3. The charging system according to claim 1, wherein
   the DC signal detected by the DC signal detection unit is a DC voltage, and
   the AC signal detected by the AC signal detection unit is an AC voltage.

4. The charging system according to claim 1, wherein the secondary battery device is mounted on an autonomous moving robot.

* * * * *